Feb. 25, 1964   N. LEVIZZANI   3,122,385
SCAFFOLDING-BRACE LOCK
Filed Nov. 15, 1960
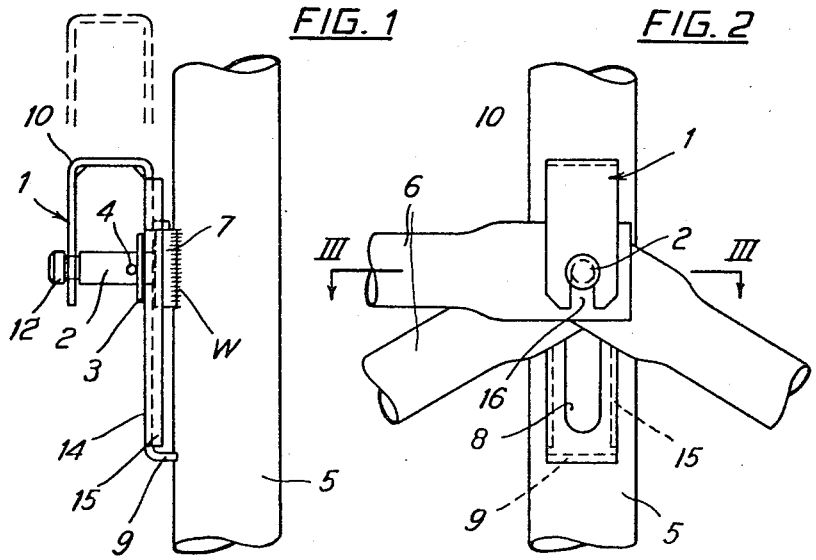
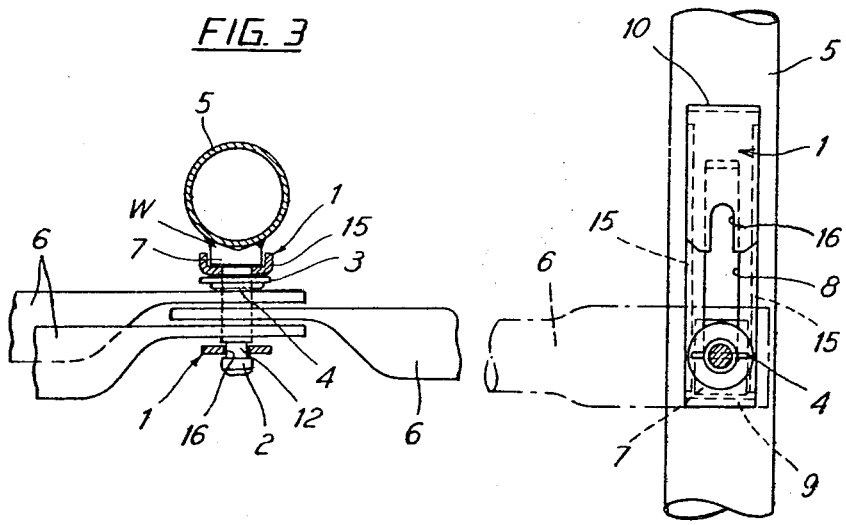
INVENTOR.
NORBERTO LEVIZZANI
BY
Karl F. Ross
AGENT 3,122,385
SCAFFOLDING-BRACE LOCK
Norberto Levizzani, Milan, Italy, assignor to Ponteggi
  Tubolari-Dalmine Innocenti S.p.A., Milan, Italy, a corporation of Italy
Filed Nov. 15, 1960, Ser. No. 69,399
Claims priority, application Italy Sept. 13, 1960
2 Claims. (Cl. 287—53.5)

The extensive use of nuts and bolts in the jointing of tubes is commonly known, especially where a strong pressure is required between the parts to be joined together. The object of my invention is to provide a brace lock for such tubular scaffolding whereby nuts and bolts are eliminated and a simpler, more rapidly operable and more economical joint is created affording considerable saving in assembly time.

An embodiment of my invention is clearly represented in the attached drawing in which:

FIG. 1 is a side-elevational view of my improved brace lock;

FIG. 2 is a front-elevational view thereof;

FIG. 3 is a cross-sectional view taken on the line III—III of FIG. 2; and

FIG. 4 is a view similar to FIG. 2, closing the lock in released position.

A cylindrical stud 2 serves for engagement of flattened extremities of several inclined and horizontal tubular braces 6, one end of this stud being rigid with a prismatic guide block 7 which is welded to a tubular upright 5 of a scaffolding structure. Near its free opposite end, stud 2 has a reduced diameter defining a small annular groove into which engages a bifurcated extremity 16 of a slidable latch 1. Block 7 is shown welded at W to upright 5.

The latch 1 is made from a simple piece of folded flat iron bent in the shape of an inverted letter J so to form a stirrup embracing the flattened extremities of the tubes 6. The bifurcation 14 is formed on the short leg of the J.

The long leg 14 of the latch 1 has a slit 8 and over a considerable part of its length, is of U-shaped section in such a manner as to straddle the block 7 by its parallel lateral flanges 15. This leg terminates in a spur 9, bent at right angles, which bears against upright 5. Slit 8 permits the latch 1 to move up and down for a certain distance on upright 5; a washer 3 and a cotter pin 4 maintain the latch in contact with the block 7 as it slides into locking engagement with the braces 6 slipped onto stud 2.

The brace lock herein disclosed facilitates the construction of a tubular scaffolding in a simple, rapid and safe manner.

Naturally, the invention is not limited to the specific embodiment described and illustrated but may be modified without departing from the scope of the appended claims.

I claim:

1. In a scaffolding-brace lock, the combination with an elongated support of:

a prismatic guide body secured to said support and having a pair of parallel lateral surfaces extending in the direction of the major dimension of said support and a flat forward face perpendicular to said lateral surfaces;

a stud rigidly secured at one extremity thereof to said body intermediate said lateral surfaces and extending transversely to said direction for removably receiving at least one scaffolding brace adapted to be slipped onto said stud, said stud being provided with an annular peripheral groove at its forward other extremity remote from said body;

a latching member of inverted generally J-shaped configuration forwardly of said body and having a relatively long leg and a relatively short leg lying along a plane common to said support and said stud, said relatively long leg slidingly overlying said face in surface contact therewith and being provided with a longitudinally extending slot slidably receiving said stud, said long leg having a pair of spaced, substantially parallel flanges each slidingly engaging a respective one of said lateral surfaces outwardly thereof, said short leg having a bifurcated free extremity engageable in said groove in a first position of said latching member for locking said brace onto said support but spaced from said stud in a second position of said latching member, longitudinally offset from said first position along said support, whereby said brace may be removably positioned on said stud; and retaining means on said stud engageable with said long leg for limiting displacement of said latching member along said stud in the second position of said latching member.

2. A combination as defined in claim 1 wherein said relatively long leg is provided with a transverse spur beyond said parallel flanges in sliding contact with said support.

References Cited in the file of this patent
UNITED STATES PATENTS

| | | |
|---|---|---|
| 2,716,576 | Nordone | Aug. 30, 1955 |
| 2,726,902 | Borgman et al. | Dec. 13, 1955 |
| 2,808,298 | Meng | Oct. 1, 1957 |
| 2,841,452 | Borgman et al. | July 1, 1958 |
| 2,935,346 | Marr | May 3, 1960 |
| 3,017,208 | Wyse | Jan. 16, 1962 |